United States Patent
Huang et al.

(10) Patent No.: US 9,632,818 B2
(45) Date of Patent: Apr. 25, 2017

(54) IDENTIFYING PERFORMANCE BOTTLENECK OF TRANSACTION IN TRANSACTION PROCESSING SYSTEM

(71) Applicant: International Business Machines Corporation, Armonk, NY (US)

(72) Inventors: Ting Ting Huang, Beijing (CN); Guan Jun Liu, Beijing (CN); Niao Qing Liu, Beijing (CN); Ai Lian Mi, Beijing (CN); Bei Chun Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/797,557

(22) Filed: Jul. 13, 2015

(65) Prior Publication Data

US 2016/0034301 A1 Feb. 4, 2016

(30) Foreign Application Priority Data

Jul. 29, 2014 (CN) .......................... 2014 1 0367825

(51) Int. Cl.
*G06F 9/46* (2006.01)
*G06F 9/54* (2006.01)

(52) U.S. Cl.
CPC .............. *G06F 9/467* (2013.01); *G06F 9/541* (2013.01)

(58) Field of Classification Search
None
See application file for complete search history.

(56) References Cited

U.S. PATENT DOCUMENTS

| 6,301,701 B1 * | 10/2001 | Walker ............... G06F 11/3688 702/123 |
| 6,449,739 B1 * | 9/2002 | Landan ................ G06F 11/323 709/224 |
| 7,127,421 B1 | 10/2006 | Beacham et al. |
| 8,677,324 B2 | 3/2014 | Markuza et al. |

(Continued)

FOREIGN PATENT DOCUMENTS

| WO | WO2013/159495 A1 | 10/2013 |
| WO | WO2014/046885 A2 | 3/2014 |

OTHER PUBLICATIONS

"Identify bottlenecks", Hewlett Packard, HP Performance Center Suite, Brochure, http://h20195.www2.hp.com/V2/GetPDF.aspx%2F4AA0-9590ENW.pdf, May 2013 Rev. 5, 8 pages.

(Continued)

*Primary Examiner* — Emerson Puente
*Assistant Examiner* — Mehran Kamran
(74) *Attorney, Agent, or Firm* — Francis Lammes; Stephen J. Walder, Jr.; Richard A. Wilhelm

(57) ABSTRACT

A mechanism is provided for identifying a performance bottleneck of a transaction in a transaction processing system. At a predefined time point, status information of an interaction between the transaction and a processing component among one or more processing components in the transaction processing system is collected. A duration of the interaction on the basis of the status information is determined. In response to the duration exceeding a predefined threshold, the interaction is identified as the performance bottleneck of the transaction in order to make changes to the transaction processing system thereby improving performance.

19 Claims, 7 Drawing Sheets

(56) References Cited

U.S. PATENT DOCUMENTS

| | | | | |
|---|---|---|---|---|
| 8,966,454 B1* | 2/2015 | Michelsen | G06F 11/3466 | 709/223 |
| 2002/0198984 A1* | 12/2002 | Goldstein | G06F 11/323 | 709/224 |
| 2007/0016831 A1* | 1/2007 | Gehman | G06F 11/079 | 714/43 |
| 2007/0022133 A1* | 1/2007 | Barghouthi | G06F 17/30289 | |
| 2007/0022154 A1* | 1/2007 | Saunders | G06F 8/30 | 709/201 |
| 2007/0157210 A1* | 7/2007 | Inoue | G06F 9/485 | 718/105 |
| 2007/0239420 A1* | 10/2007 | Papaefstathiou | H04L 41/145 | 703/14 |
| 2007/0266148 A1* | 11/2007 | Ruiz | H04L 12/2697 | 709/224 |
| 2007/0271219 A1* | 11/2007 | Agarwal | G06F 11/008 | |
| 2008/0065702 A1* | 3/2008 | Dickerson | G06F 17/30306 | |
| 2009/0037914 A1* | 2/2009 | Chagoly | G06F 11/3006 | 718/101 |
| 2009/0125581 A1* | 5/2009 | Schneider | G06F 11/3414 | 709/203 |
| 2010/0161789 A1* | 6/2010 | Walia | G06F 11/3414 | 709/224 |
| 2010/0228650 A1* | 9/2010 | Shacham | G06F 17/30477 | 705/34 |
| 2011/0016094 A1* | 1/2011 | Chase | G06F 17/5045 | 707/685 |
| 2011/0055376 A1* | 3/2011 | Little | G06F 9/466 | 709/224 |
| 2011/0154340 A1* | 6/2011 | Kanemasa | G06F 11/3495 | 718/100 |
| 2011/0161395 A1* | 6/2011 | O'Donnell, III | G06F 11/3414 | 709/203 |
| 2012/0090037 A1* | 4/2012 | Levit | G06Q 10/103 | 726/28 |
| 2012/0101802 A1* | 4/2012 | Nonoyama | G06F 11/3466 | 703/22 |
| 2013/0179144 A1 | 7/2013 | Lu et al. | | |
| 2014/0365998 A1* | 12/2014 | Koul | G06F 3/0481 | 717/113 |
| 2015/0032884 A1* | 1/2015 | Greifeneder | H04L 67/10 | 709/224 |
| 2015/0074035 A1* | 3/2015 | Narasappa | G06N 7/005 | 706/52 |
| 2015/0277964 A1* | 10/2015 | Atkins | G06Q 40/00 | 718/101 |
| 2016/0026950 A1* | 1/2016 | Kapur | G06Q 10/0639 | 705/7.38 |
| 2016/0028854 A1* | 1/2016 | Leeb | H04L 67/10 | 709/203 |

OTHER PUBLICATIONS

Rahm, Erhard, "Goal-oriented performance control for transaction processing", Proc. 9. ITG/GI MMB97 conf., VDE-Verlag,http://citeseerx.ist.psu.edu/viewdoc/download?doi=10.1.1.368.1167&rep=rep1&type=pdf, (month unknown) 1997, 16 pages.

* cited by examiner

IDENTIFYING PERFORMANCE BOTTLENECK OF TRANSACTION IN TRANSACTION PROCESSING SYSTEM

BACKGROUND

Various embodiments of the present invention relate to transaction processing, and more specifically, to a method and apparatus for identifying a performance bottleneck of a transaction in a transaction processing system.

With the development of computer technology, transaction processing systems have already been involved in various respects in people's daily work and life and have become key systems to support mission critical businesses around the world. For example, transaction processing systems are widely used in institutions like banks to provide automated transaction processing. The transaction processing system used by a bank may process a variety of transactions, such as customer-requested deposit, withdrawal, transfer and so on.

So far the transaction processing system can concurrently process tens of thousands of transactions and even more. For example, the transaction processing system of a bank can serve a plurality of countries and regions and can simultaneously respond to requests from users in various countries and regions. The transaction processing system can comprise a plurality of processing components. For example, the transaction processing system for banking as provided by IBM® may comprise a number of processing components such as CICS Transaction Server, CICS TXSeries, Tuxedo, WAS, Weblogic, Jboss, Database System (e.g. DB2, Oracle DB, Mysql), Queue manager (e.g. WMQ) etc., and other processing components provided by the Operating System. These processing components coordinate with each other to support transaction processing.

Typically the transaction processing system is highly demanding on the response time; this requires maintainers of the transaction processing system to quickly find out causes of problems and solve the problems when the problems occur in one or more processing components of the system. However, since the existing transaction processing system is too complex and involves various kinds of configuration operations, the causes for low performance of the transaction processing system might be complex.

The performance of the transaction processing system might be subject to the influence from various respects of processing components, for example, the low performance might be a joint result from problems in a plurality of processing components. In a complex transaction processing system, it might take several and even dozens of days to find out causes affecting the performance, with joint efforts of technical experts proficient in respective processing components.

Considering that in the prior art there is no effective means to pinpoint a performance bottleneck of a transaction processing system, it becomes a research focus nowadays regarding how to effectively track a transaction processing flow in the transaction processing system and quickly locate in the flow a bottleneck that affects the transaction processing performance.

SUMMARY

Therefore, it is desired to develop a technical solution capable of tracking a transaction processing flow and accurately, efficiently identifying a performance bottleneck of the transaction. Further, it is desired that the technical solution can be implemented without affecting daily transaction processing of the transaction processing system, and it is desired to implement the technical solution without changing hardware and software configuration of the existing transaction processing system as far as possible.

In one embodiment of the present invention, there is provided a method for identifying a performance bottleneck of a transaction in a transaction processing system, comprising: collecting, at a predefined time point, status information of an interaction between the transaction and a processing component among one or more processing components in the transaction processing system; determining a duration of the interaction on the basis of the status information; and in response to the duration exceeding a predefined threshold, identifying the interaction as the performance bottleneck of the transaction in order to make changes to the transaction processing system thereby improving performance.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
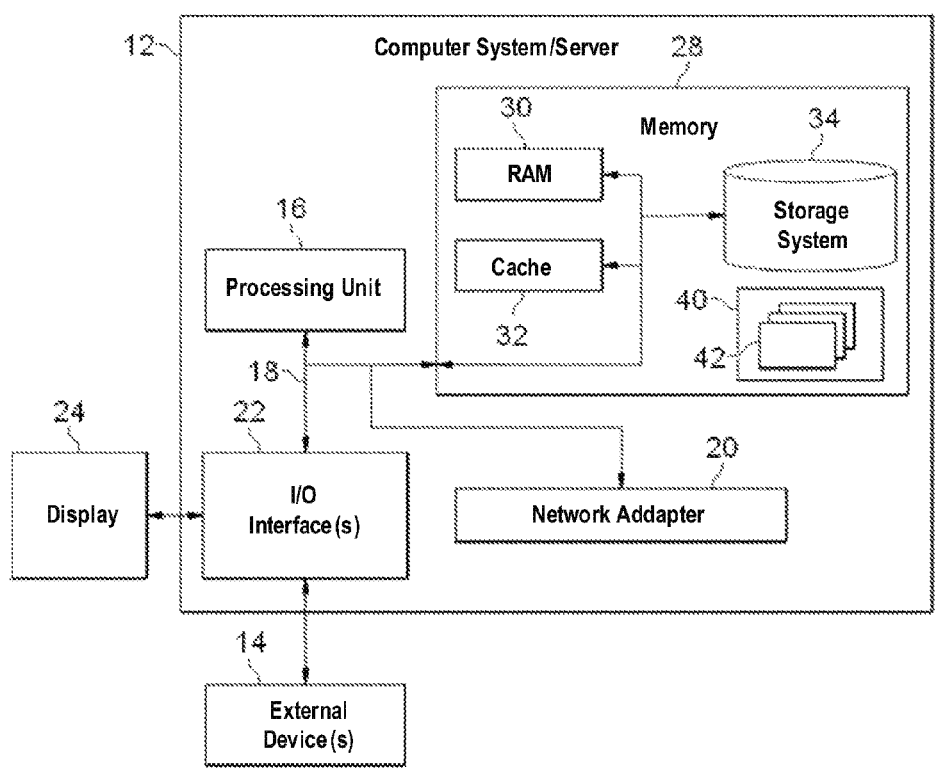
FIG. 1 schematically shows an exemplary computer system/server 12 which is applicable to implement the embodiments of the present invention.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as welt as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Throughout the context of the present invention, various embodiments of the present invention are illustrated by taking the bank's transaction processing system as a specific application environment. Those skilled in the art should understand the embodiments of the present invention may further be applied to other transaction processing system in other application environment.

So far there are mainly two types of technical solutions for monitoring a transaction processing systems, i.e., performance records-based methods and monitoring-based methods.

The performance records-based method mainly focuses on how to collect the performance records in each processing component involved in a transaction. Typically different processing components have their own monitoring mechanisms and cannot provide a uniform monitoring interface. For example, processing components like CICS, DB2, IMS and MQ write all performance records associated with various processing components to a dedicated component SMF, and zOS writes performance records associated with itself to RMF.

The main limitations of this method include that the method can collect raw performance data of different processing components, whereas the raw performance data cannot directly indicate causes for low performance. For example, when CICS collects performance records, CICS technical experts are required to analyze performance records associated with a transaction. If they find that causes for low performance do not come from CICS but from other processing components in the transaction processing system, then technical experts proficient in the other processing components are required to further analyze performance records associated with the other processing components. On the other hand, the collected performance records are accumulative performance metrics (for example, CICS may collect all the elapsed time of File IO associated with a specific field) of a specific type interactive, but the duration of each interaction associated with specific File IO cannot be differentiated. Therefore, the performance records-based method cannot quickly pinpoint the performance bottleneck.

Figure 2:
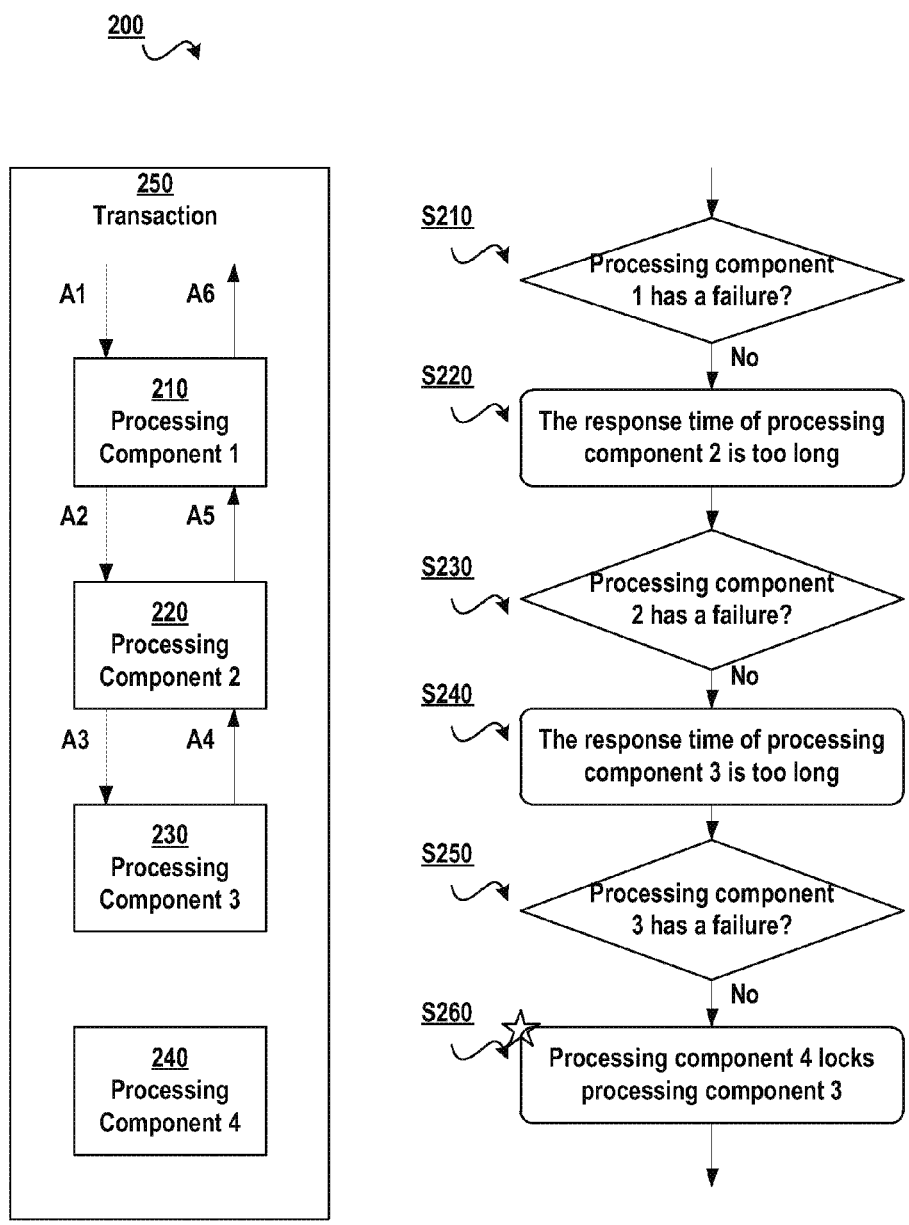
FIG. 2 schematically shows a block diagram of identifying a performance bottleneck of a transaction in a transaction processing system according to one technical solution.

FIG. 2 schematically shows a block diagram 200 of identifying a performance bottleneck of a transaction in a transaction processing system according to one technical solution. As shown in this figure, a method based on collected performance records is used to analyze a performance bottleneck in the transaction processing system. A transaction 250 involves a plurality of processing components in the transaction processing system. In other words, transaction 250 may interact with a plurality of processing components (a processing component 1 210, a processing component 2 220, a processing component 3 230, and a processing component 4 240) in the transaction processing system. Arrows A1 to A6 in FIG. 2 show a flow of processing transaction 250: processing component 1 210→processing component 2 220→processing component 3 230→processing component 2 220→processing component 1 210, and the entire flow proceeds under the monitoring of processing component 4 240.

A flowchart S210 to S260 in the right of FIG. 2 shows a method for determining a performance bottleneck of transaction 250 according to the prior art. First of all, in step S210, it is checked whether or not a failure occurs in processing component 1 210. When it is found processing component 1 runs normally, the operational flow proceeds to step S220 where it is found the response time of processing component 2 is too long. Then, the operational flow proceeds to step S230 to determine whether or not a failure occurs in processing component 2. If it is found processing component also runs normally, the operational flow proceeds to step S240. In step S240, it is found the response time of processing component 3 is too long. Subsequently, in step S250 it is determined whether or not processing component 3 runs normally.

Those skilled in the art should note steps S210 to S250 need to be executed by technical experts proficient in processing component 1 210, processing component 2 220 and processing component 3 230 respectively, which incurs huge manpower and time costs during the whole diagnosis process. However, causes for the low performance of transaction 250 are still not found at this point. Next, the processing flow goes to step S260 to check the status of processing component 4, at which point it is found processing component 4 locks processing component 3 and thus causes a long response time of processing component 3. In this example, that processing component 4 locks processing component 3 is the performance bottleneck.

As seen from the foregoing description with reference to FIG. 2, the method based on the prior solution costs huge manpower and material resources to pinpoint the performance bottleneck and cannot pinpoint the performance bottleneck quickly.

The monitoring-based method depends on monitoring the running status of the transaction processing system. For example, there have been developed monitoring tools like Tivoli OMEGAMON and Computeware TMON. However, these monitoring tools can only monitor the key performance indicators in the transaction processing system and cannot indicate causes for the low performance when problems occur in processing components in the transaction processing system.

It can be seen that the existing performance records-based method and monitoring-based method cannot quickly and accurately pinpoint the performance bottleneck in a transaction processing system. In view of these drawbacks, embodiments of the present invention propose a method for identifying a performance bottleneck of a transaction in a transaction processing system. The method comprises: collecting, at a predefined time point, status information of an interaction between the transaction and a processing component among one or more processing components in the transaction processing system; determining duration of the interaction on the basis of the status information; and in response to the duration exceeding a predefined threshold, identifying the interaction as the performance bottleneck of the transaction.

Figure 3:
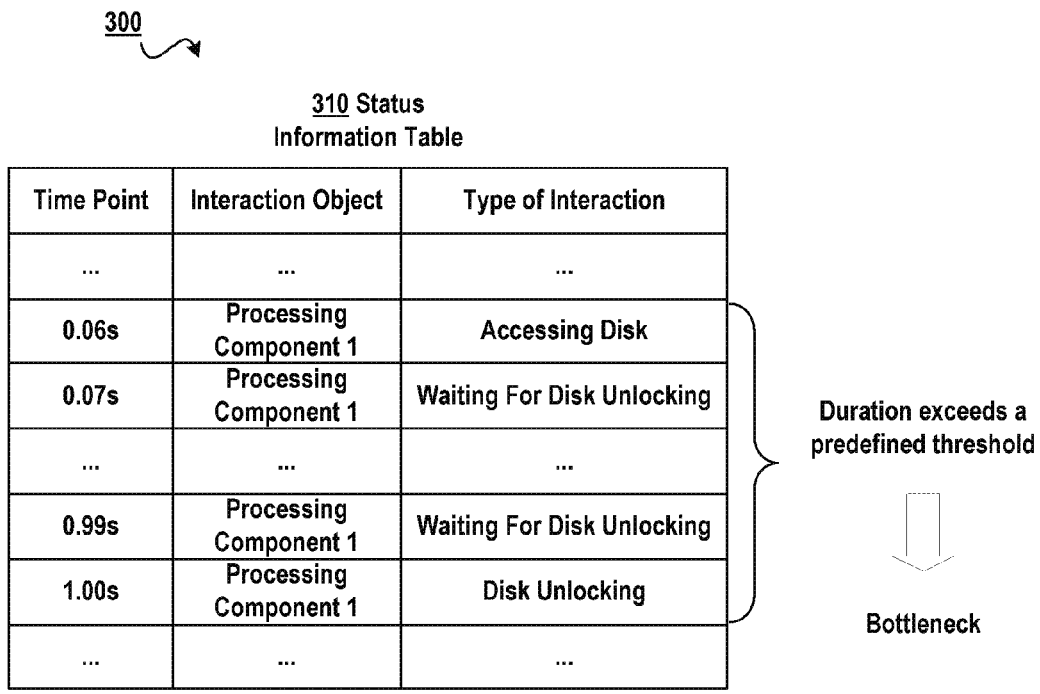
FIG. 3 schematically shows a block diagram of a technical solution for identifying a performance bottleneck of a transaction in a transaction processing system according to one embodiment of the present invention.

FIG. 3 schematically shows a block diagram 300 of a technical solution for identifying a performance bottleneck of a transaction in a transaction processing system according to one embodiment of the present invention. The technical solution adopting the embodiment of the present invention can collect, at a predefined time point, status information of an interaction between the transaction and a processing component among one or more processing components in the transaction processing system, and obtain status information as shown in a status information table 310.

In one embodiment of the present invention, status information of an interaction between the transaction and a processing component may be collected at predefined time intervals (e.g., 0.01 s). For example, the second line in status information table 310 shows the transaction interacts with processing component 1 at a time point 0.06 s, and the interaction type is access to disk; for another example, status information table 310 indicates from the time point 0.06 s to a time point 0.99 s, the transaction interacts with processing component 1, and the interaction type is wait for disk unlocking; for yet another example, status information table 310 indicates at a time point 1.00 s, the transaction interacts with processing component 1, and the interaction type is disk unlocking.

At this point, it can be found the duration (1.00−0.06=0.94 s) of an interaction between the transaction and processing component 1 is much more than a normal interaction time (e.g., 0.05 s). Therefore, it can be determined the interaction between the transaction and processing component 1 is a performance bottleneck.

Further, the performance bottleneck may be determined at a finer granularity. For example, the duration of "waiting for disk unlocking" is (1.00−0.07=0.93 s), which is far greater than a normal interaction time (e.g., 0.03 s). At this point, it can be determined that "waiting for disk unlocking" is the performance bottleneck affecting the transaction processing system.

Those skilled in the art may understand the computation load of determining the duration of an interaction on the basis of status information and subsequently comparing the duration with a threshold time is quite small and thus can be ignored. With the technical solution of the present invention, the main time overhead is concentrated on the step of collecting status information. In the example as shown in FIG. 3, the collecting time is about 1 s, so the performance bottleneck can be determined within a magnitude order of "second." According to the existing technical solution, however, to find out the performance bottleneck it requires cooperation between technical experts proficient in multiple processing components and a couple of days and even longer. Therefore, compared with the performance records-based method in the prior art as shown in FIG. 2, the technical solution of the present invention can significantly reduce the diagnosis time and quickly, accurately identify the performance bottleneck in the transaction processing system.

Figure 4:
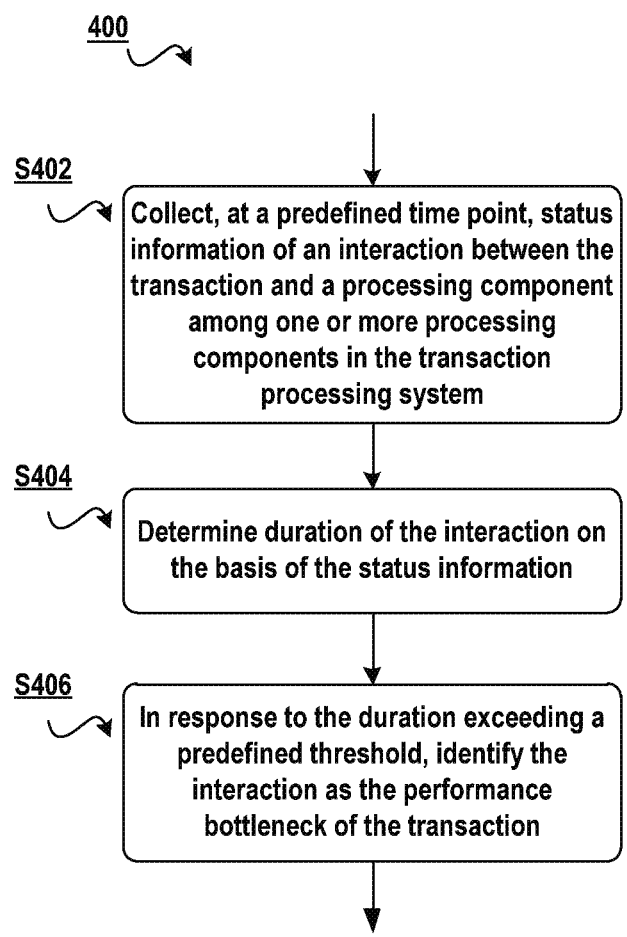
FIG. 4 schematically shows a flowchart of a method for identifying a performance bottleneck of a transaction in a transaction processing system according to one embodiment of the present invention.

With reference to the accompanying drawings, detailed description is presented below to details to various embodiments of the present invention. FIG. 4 schematically shows a flowchart 400 of a method for identifying a performance bottleneck of a transaction in a transaction processing system according to one embodiment of the present invention. First of all, in step S402, status information of an interaction between the transaction and a processing component among one or more processing components in the transaction processing system is collected at a predefined time point. The status information may comprise an interaction object (i.e., the processing component with which the transaction is interacting). In this embodiment, status information of an interaction between the transaction and a processing component may be collected at a predefined time point through the whole lifecycle of processing the transaction.

Those skilled in the art may collect the status information of interaction(s) between the transaction and one or more processing components on the basis of requirements of a concrete application environment. For example, here the whole lifecycle of processing the transaction involves a plurality of processing components, status information of an interaction between the transaction and each processing component may be collected.

In one embodiment of the present invention, the status information may be collected at fixed time intervals, or the status information may be collected on the basis of concrete needs rather than at fixed time intervals. Those skilled in the art should understand the transaction processing system has a strong data processing capability and can concurrently process tens of thousands of transaction and even more. Therefore, only a quite light workload will be caused on the transaction processing system by collecting status data at predefined time intervals according to the technical solution of the present invention, and the additional overhead of computing resources caused by implementing the technical solution of the present invention can be completely ignored.

In step S404, duration of the interaction is determined on the basis of the status information. For example, when it is found the transaction interacts with processing component 1 all through a time point 1 to a time point n, a time period through time point 1 to time point n may be taken as the duration of the interaction.

It is appreciated that, in the embodiments of the present invention, since the status information of the interaction is collected at discrete time points, the size of the interval between time points has influence on the accuracy of the duration resulting from calculation. Although in the context of the present invention the duration resulting from calculation is not accurate duration of the interaction, the duration can reflect time distribution for different interactions more accurately, and as the time interval shortens, the duration can better approximate the real duration.

In step S406, in response to the duration exceeding a predefined threshold, the interaction is identified as the performance bottleneck of the transaction. In this embodiment, those skilled in the art may set a value of the predefined threshold on the basis of historical experience. For example, regarding a specific transaction, a predefined threshold of interaction between this transaction and DB2 may be set as 0.05 s, and a predefined threshold of the interaction between this transaction and CICS may be set as 0.07 s, etc. When it is found that the actually measured duration exceeds the predefined threshold, the interaction is regarded as the performance bottleneck.

It is appreciated that, the predefined threshold is exemplary throughout the context of the present invention, and those skilled in the art may set other value on the basis of historical experience of running various processing components. In one embodiment of the present invention, the accuracy of the predefined threshold may further be correlated to the size of time intervals of collecting the status information. For example, the smaller time intervals, the higher the accuracy of the predefined threshold.

In one embodiment of the present invention, there is further comprised: collecting a type of the interaction; and identifying other interaction of the type between the transaction and the processing component as the performance bottleneck.

In this embodiment, to identify the performance bottleneck at a finer granularity, a type of the interaction may further be collected (for example, as shown in FIG. 3, types of interactions with processing component 1 may be "accessing disk," "waiting for disk unlocking," "disk unlocking," etc.). At this point, the duration associated with each type of interaction may be determined, so that when the duration exceeds a predefined threshold, an interaction of the type between the transaction and a processing component is identified as the performance bottleneck.

Specifically, regarding the example shown in FIG. 3, when it is found the duration of "waiting for disk unlocking" exceeds a predefined threshold, an interaction of the "waiting for disk unlocking" type may be identified as the performance bottleneck.

In one embodiment of the present invention, the collecting, at the predefined time point, the status information of an interaction between the transaction and the processing component among one or more processing components in the transaction processing system comprises: building a dummy transaction corresponding to the transaction; and collecting, at a predefined time point, status information of an interaction between the dummy transaction and the processing component as the status information of the interaction between the transaction and the processing component.

Figure 5:
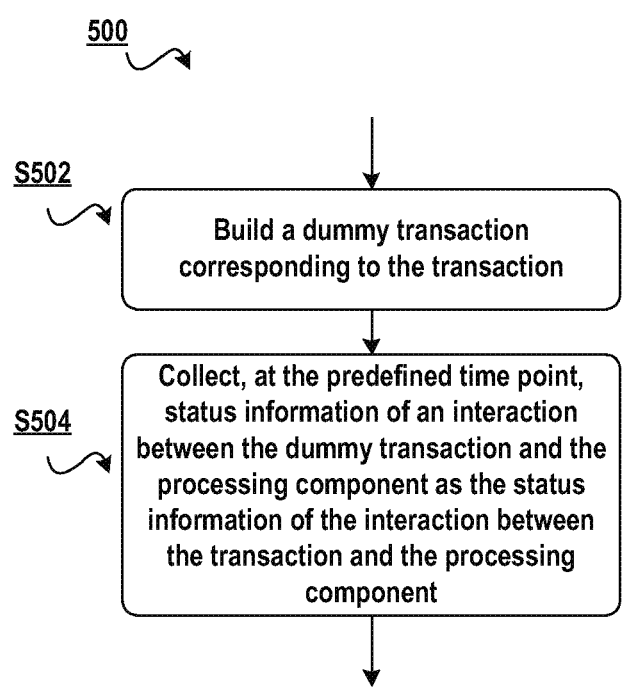
FIG. 5 schematically shows a flowchart of a method for collecting status information of an interaction between a transaction and a processing component according to one embodiment of the present invention.

Specifically, FIG. 5 schematically shows a block diagram 500 of a method for collecting status information of an interaction between a transaction and a processing component. In step S502, a dummy transaction corresponding to the transaction is built.

In the embodiments of the present invention, although collecting status information of the interaction will only cause a very slight and negligible workload on the transaction processing system, to track a real transaction in the transaction processing system might reveal sensitive data involved in the transaction. For example, when the transaction is a transaction of processing a transfer request of a bank customer, adverse impact might be exerted on account information of the remitting customer and account information of the receiving customer. Therefore, in order to increase the data security inside the transaction processing system, a dummy transaction corresponding to the transaction may further be built, and subsequently the performance bottleneck is found on the basis of tracking status information of the interaction between the dummy transaction and the processing component.

In step S504, status information of the interaction between the dummy transaction and the processing component is collected at the predefined time point as the status information of the interaction between the transaction and the processing component. Since the dummy transaction corresponds to the real transaction, by tracking the dummy transaction, on the one hand needed information can be collected, and on the other hand no impact will be exerted on daily transaction processing in the transaction processing system.

In one embodiment of the present invention, the building the dummy transaction corresponding to the transaction comprises: obtaining a sequence of interactions between the transaction and one or more processing components in the transaction processing component when processing the transaction in the transaction processing component; and building the dummy transaction on the basis of the sequence so that the dummy transaction executes interactions in the sequence in order when processing the dummy transaction in the transaction processing component.

A key point to build a dummy transaction corresponding to the transaction is that when processing a dummy transaction in the transaction processing system, the interaction order and interaction objects of the interaction executed by the dummy transaction should be consistent with the interaction order and interaction objects of the interaction executed by the real transaction, and thus a sequence of interactions between the transaction and one or more processing components in the transaction processing system needs to be extracted.

Specifically, regarding the example shown in FIG. 2, a sequence of interactions between transaction 250 and various processing components may be processing component 1 210→processing component 2 220→processing component 3 230→processing component 2 220→processing component 1 210. Subsequently, a dummy transaction is built on the basis of the sequence so that the dummy transaction executes interactions in the sequence in order when processing the dummy transaction in the transaction processing system. In this embodiment, a sequence of interactions between the dummy transaction and various processing components in the transaction processing system is also processing component 1 210→processing component 2 220→processing component 3 230→processing component 2 220→processing component 1 210.

In one embodiment of the present invention, the obtaining a sequence of interactions between the transaction and the one or more processing components in the transaction processing component when processing the transaction in the transaction processing component comprises: extracting the transaction's calling of the one or more processing components from an implementation of the transaction; and generating the sequence on the basis of the calling.

Those skilled in the art may understand since with which processing component(s) in the transaction processing system the transaction interacts and in which order is defined by the calling of processing component(s) in a concrete implementation (e.g., code or executable program) of the transaction, a sequence of interactions may be determined on the basis of the transaction's calling of processing component(s). Hereinafter, description is presented to how to determine a sequence of interactions on the basis of the calling of processing component(s) in a concrete implementation of the transaction.

In one embodiment of the present invention, the implementation of the transaction is code implementing the transaction, and the extracting the transaction's calling of the one or more processing components from an implementation of the transaction comprises: looking up a keyword in code of the transaction so as to obtain the calling. Table 1 schematically shows an example of code of the transaction below.

TABLE 1

Code of Transaction

.....
EXEC CICS READ FILE("customer")
.....
EXEC SQL SELECT TABLE("customer")
.....
EXEC SQL UPDATE TABLE("customer")
.....
EXEC CICS WRITE FILE ("customer")
.....
EXEC CICS RETURN The calling of processing components is implemented via an application programming interface (API) and/or a system programming interface (SPI). Moreover, the API/SPI has a fixed format. Specifically, in CICS, all APIs/SPIs start with EXEC CICS, while in DB2, all APIs/SPIs start with EXEC SQL, etc. Therefore, the calling of processing components may be obtained by looking up a keyword.

In one embodiment of the present invention, the code is source code, and the looking up a keyword in the code of the transaction so as to obtain the calling comprises: looking up a function name in the source code so as to obtain the calling. When the code is source code, by looking up a function name (e.g., "EXEC CICS READ FILE," "EXEC SQL SELECT TABLE," etc.) in the source code, the transaction's calling of processing components may be obtained and further the sequence of interactions obtained.

In one embodiment of the present invention, the code is executable code, and the looking up a keyword in the code of the transaction so as to obtain the calling comprises: looking up a binary prefix in the executable code so as to obtain the calling.

In some cases, executable code instead of source code of the transaction can only be obtained. Since executable code is generated on the basis of compiling source code, and a function name in a fixed format in source code will be transformed into a specific binary prefix, the specific binary prefix may be looked up in the executable code, whereby the transaction's calling of processing components is obtained and further the sequence of interactions is obtained.

In one embodiment of the present invention, the implementation of the transaction is an executable program of the transaction, and the extracting the transaction's calling of the one or more processing components from an implementation of the transaction comprises: obtaining the calling from an interface manager in the transaction processing system during running the executable program.

During running the executable program, API/SPI needs to be managed by an interface manager in the transaction processing system, so it may be obtained from the interface manager when the transaction calls which API(s)/SPI(s). Thereby, the transaction's calling of processing components can be obtained accurately.

In one embodiment of the present invention, the building a dummy transaction on the basis of the sequence comprises: copying a portion in the implementation of the transaction which corresponds to the interaction in the sequence, as an implementation of the dummy transaction; and using dummy data to replace sensitive data in the implementation of the dummy transaction.

Continuing the code of the transaction as shown in Table 1 above, description is presented to how to build a dummy transaction. After obtaining the sequence of interactions by using the above method, a portion in the code shown in Table 1 which corresponds to the interaction in the sequence may be copied, i.e., contents as shown in Table 1 may be copied.

Figure 6:
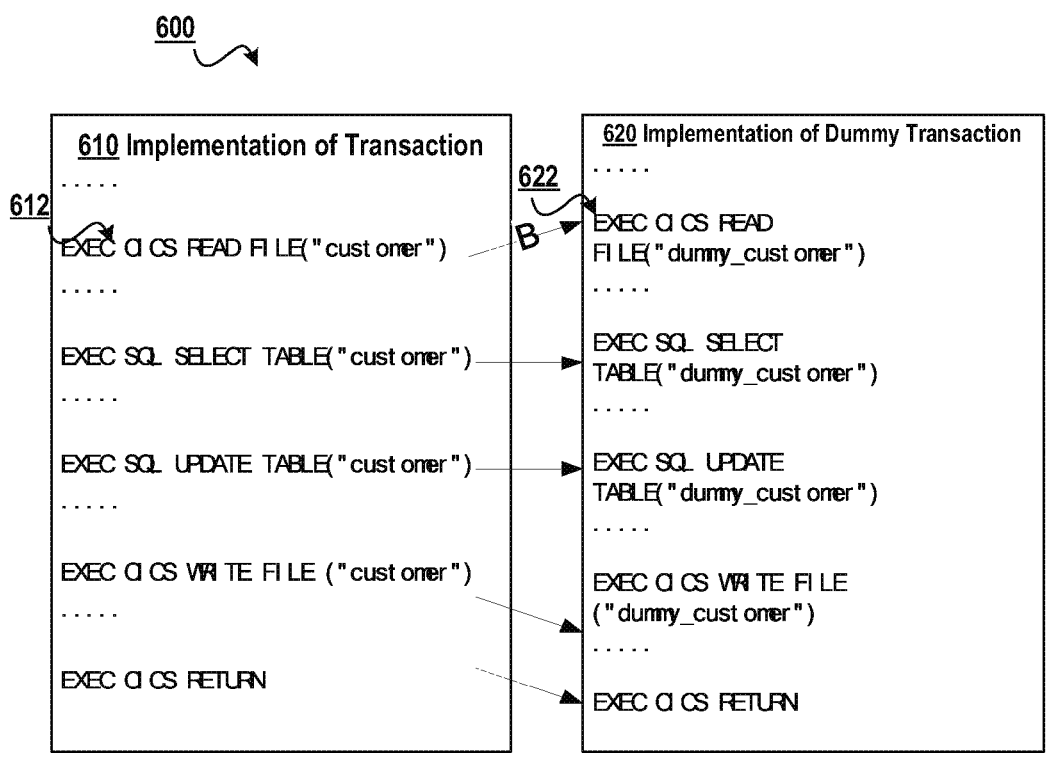
FIG. 6 schematically shows a block diagram of a technical solution for building a dummy transaction on the basis of a sequence according to one embodiment of the present invention.

Subsequently, sensitive data (e.g., data associated with "customer") in the copied contents is replaced by dummy data to build the dummy transaction. FIG. 6 schematically shows a block diagram 600 of a technical solution for building a dummy transaction on the basis of a sequence according to one embodiment of the present invention. As shown in FIG. 6, a reference numeral 610 shows an implementation of the transaction, and a reference numeral 620 shows an implementation of the dummy transaction.

Detailed description is presented below by means of EXEC CICS READ FILE ("customer") only. EXEC CICS READ FILE ("customer") involves customer sensitive data, such as the bank's account data "customer." In one embodiment of the present invention, for the sake of security dummy account data "dummy customer" may be built in the transaction processing system, and real account data "customer" in the transaction is replaced by the dummy account data (as shown by arrow B in FIG. 6).

In this manner, an API 622 in implementation 620 of the dummy transaction can be generated on the basis of an API 612 in implementation 610 of the transaction. On the basis of the above principle, those skilled in the art may accomplish processing of other APIs, and a dummy transaction generated ultimately is as shown by reference numeral 620. A detailed step will not be detailed in the context of the present invention.

In one embodiment of the present invention, there is further comprised: simplifying the implementation of the dummy transaction. Specifically, the implementation of the dummy transaction might include some contents (such as mathematical computation, etc.) that are irrelevant to the tracking of interactions between the transaction and various processing components, so these irrelevant contents may be removed so as to simplify the implementation of the dummy transaction.

In one embodiment of the present invention, the collecting, at the predefined time point, the status information of an interaction between the transaction and the processing component among the one or more processing components in the transaction processing system comprises: collecting the status information at the predefined time point in response to any one of: a timeout of processing the transaction in the transaction processing system; and at predefined time intervals.

The transaction processing system may concurrently process tens of thousands of transaction and even more; these transactions may of the same type or different types. For example, a transaction processing system for banking may concurrently process various types of transactions, such as deposit transactions, withdrawal transactions, transfer transactions etc., from customers in various countries and regions. The method of the present invention may be executed where it is found a certain type of transactions has a large latency, or the method of the present invention may further be executed periodically during run-time of the transaction processing system so as to ensure the transaction processing system is in normal running state.

The embodiments of the present invention can pinpoint the performance bottleneck in the transaction processing system. For example, when finding the transaction for processing deposit requests from customers has a large latency, code related to a deposit transaction may be provided, a dummy transaction associated with the deposit transaction may be built, and further a performance bottleneck in the deposit transaction may be determined. Or in order to ensure various transactions in the transaction processing system run normally, these transactions may be tracked periodically so as to find out whether there is a performance bottleneck affecting the processing efficiency of each transaction.

Various embodiments implementing the method of the present invention have been described above with reference to the accompanying drawings. Those skilled in the art may understand that the method may be implemented in software, hardware or a combination of software and hardware. Moreover, those skilled in the art may understand by implementing steps in the above method in software, hardware or a combination of software and hardware, there may be provided an apparatus based on the same invention concept. Even if the apparatus has the same hardware structure as a general-purpose processing device, the functionality of software contained therein makes the apparatus manifest distinguishing properties from the general-purpose processing device, thereby forming an apparatus of the various embodiments of the present invention. The apparatus described in the present invention comprises several means or modules, the means or modules configured to execute corresponding steps. Upon reading this specification, those skilled in the art may understand how to write a program for implementing actions performed by these means or modules. Since the apparatus is based on the same invention concept as the method, the same or corresponding implementation details are also applicable to means or modules corresponding to the method. As detailed and complete description has been presented above, the apparatus is not detailed below.

Figure 7:
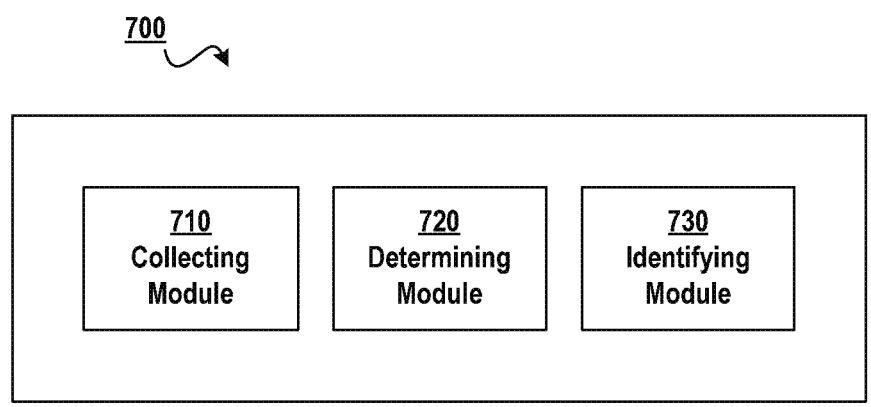
FIG. 7 schematically shows a block diagram of an apparatus for identifying a performance bottleneck of a transaction in a transaction processing system according to one embodiment of the present invention.

FIG. 7 schematically shows a block diagram 700 of an apparatus for identifying a performance bottleneck of a transaction in a transaction processing system according to one embodiment of the present invention. Specifically, the apparatus comprises: a collecting module 710 configured to collect, at a predefined time point, status information of an interaction between the transaction and a processing component among one or more processing components in the transaction processing system; a determining module 720 configured to determine duration of the interaction on the basis of the status information; and an identifying module 730 configured to, in response to the duration exceeding a predefined threshold, identify the interaction as the performance bottleneck of the transaction.

In one embodiment of the present invention, the collecting module is further configured to collect a type of the interaction; and the identifying module is further configured to identify other interaction of the type between the transaction and the processing component as the performance bottleneck.

In one embodiment of the present invention, collecting module 710 comprises: a building module configured to build a dummy transaction corresponding to the transaction; and the collecting module is further configured to collect, at the predefined time point, status information of an interaction between the dummy transaction and the processing component as the status information of the interaction between the transaction and the processing component.

In one embodiment of the present invention, the building module comprises: an obtaining module configured to obtain a sequence of interactions between the transaction and one or more processing components in the transaction processing component when processing the transaction in the transaction processing component; and a second building module configured to build the dummy transaction on the basis of the sequence so that the dummy transaction executes interactions in the sequence in order when processing the dummy transaction in the transaction processing component.

In one embodiment of the present invention, the obtaining module comprises: an extracting module configured to extract the transaction's calling of the one or more processing components from an implementation of the transaction; and a generating module configured to generate the sequence on the basis of the calling.

In one embodiment of the present invention, the implementation of the transaction is code of the transaction, and the extracting module comprises: a lookup module configured to look up a keyword in code of the transaction so as to obtain the calling.

In one embodiment of the present invention, the implementation of the transaction is an executable program of the transaction, and the extracting module comprises: an obtaining module configured to obtain the calling from an interface manager in the transaction processing system when running the executable program.

In one embodiment of the present invention, the building module comprises: a copying module configured to copy a portion in the implementation of the transaction which corresponds to the interaction in the sequence, as an implementation of the dummy transaction; and a replacing module configured to use dummy data to replace sensitive data in the implementation of the dummy transaction.

In one embodiment of the present invention, the building module further comprised: a simplifying module configured to simplify the implementation of the dummy transaction.

In one embodiment of the present invention, the collecting module is further configured to collect the status information at the predefined time point in response to any one of: a timeout of processing the transaction in the transaction processing system; and at predefined time intervals.

With the method and apparatus of the present invention, a bottleneck affecting the processing performance during transaction processing can be found by tracking the transaction in the transaction processing system. In addition, since the additional computation load caused by the technical solution of the present invention can be ignored completely, the performance bottleneck of the transaction can be identified efficiently without exerting adverse impact on the normal operation of the existing transaction processing system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for identifying a performance bottleneck of a transaction in a transaction processing system, comprising:
   collecting, at a predefined time point, status information of an interaction between the transaction and a processing component among one or more processing components in the transaction processing system, wherein the collecting, at the predefined time point, the status information of the interaction between the transaction and the processing component among one or more processing components in the transaction processing system further comprises:
      building a dummy transaction corresponding to the transaction, wherein the building of the dummy transaction corresponding to the transaction comprises:
         obtaining a sequence of interactions between the transaction and one or more processing components in the transaction processing component when processing the transaction in the transaction processing component; and
         building the dummy transaction on the basis of the sequence of interactions so that the dummy transaction executes interactions in a corresponding sequence in order when processing the dummy transaction in the transaction processing component, wherein the building of the dummy transaction on the basis of the sequence comprises:
            copying a portion in an implementation of the transaction which corresponds to the interaction in the sequence of interactions, as an implementation of the dummy transaction; and
            using dummy data to replace sensitive data in the implementation of the dummy transaction; and
      collecting, at the predefined time point, status information of an interaction between the dummy transaction and the processing component as the status information of the interaction between the transaction and the processing component;
   determining a duration of the interaction on the basis of the status information; and
   in response to the duration of the interaction exceeding a predefined threshold, identifying the interaction as the performance bottleneck of the transaction in order to make changes to the transaction processing system thereby improving performance.

2. The method according to claim 1, further comprising: collecting a type of the interaction; and
   in response to the duration of the interaction exceeding a predefined threshold, identifying the type of the interaction in addition to identifying the interaction as the performance bottleneck.

3. The method according to claim 1, wherein the obtaining of the sequence of interactions between the transaction and the one or more processing components in the transaction processing component when processing the transaction in the transaction processing component comprises:
   extracting the transaction's calling of the one or more processing components from an implementation of the transaction; and
   generating the sequence of interactions on the basis of the calling.

4. The method according to claim 3, wherein the implementation of the transaction is code of the transaction, and wherein the extracting of the transaction's calling of the one or more processing components from the implementation of the transaction comprises:
   looking up a keyword in code of the transaction so as to obtain the calling.

5. The method according to claim 3, wherein the implementation of the transaction is an executable program of the transaction, and the extracting of the transaction's calling of the one or more processing components from the implementation of the transaction comprises:
   obtaining the calling from an interface manager in the transaction processing system when running the executable program.

6. The method according to claim 4, further comprising: simplifying the implementation of the dummy transaction by removing one or more pieces of content from the dummy transaction.

7. The method according to claim 1, wherein the collecting, at the predefined time point, the status information of the interaction between the transaction and the processing component among one or more processing components in the transaction processing system comprises:
  collecting the status information at the predefined time point in response to any one of:
   a timeout of processing the transaction in the transaction processing system; or
   at predefined time intervals.

8. An apparatus for identifying a performance bottleneck of a transaction in a transaction processing system, comprising:
  a processor; and
  a memory coupled to the processor, wherein the memory comprises instructions which, when executed by the processor, cause the processor to:
  collect, at a predefined time point, status information of an interaction between the transaction and a processing component among one or more processing components in the transaction processing system, wherein the instructions to collect, at the predefined time point, the status information of the interaction between the transaction and the processing component among more processing components in the transaction processing system further cause the processor to:
   build a dummy transaction corresponding to the transaction, wherein the instructions to build the dummy transaction corresponding to the transaction further cause the processor to:
    obtain a sequence of interactions between the transaction and one or more processing components in the transaction processing component when processing the transaction in the transaction processing component; and
    build the dummy transaction on the basis of the sequence of interactions so that the dummy transaction executes interactions in a corresponding sequence in order when processing the dummy transaction in the transaction processing component, wherein the instructions to build the dummy transaction on the basis of the sequence further cause the processor to:
     copy a portion in an implementation of the transaction which corresponds to the interaction in the sequence of interactions, as an implementation of the dummy transaction; and
     use dummy data to replace sensitive data in the implementation of the dummy transaction; and
   collect, at the predefined time point, status information of an interaction between the dummy transaction and the processing component as the status information of the interaction between the transaction and the processing component;
  determine a duration of the interaction on the basis of the status information; and
  in response to the duration of the interaction exceeding a predefined threshold, identify the interaction as the performance bottleneck of the transaction in order to make changes to the transaction processing system thereby improving performance.

9. The apparatus according to claim 8, wherein the instructions further cause the processor to:
  collect a type of the interaction; and
  in response to the duration of the interaction exceeding a predefined threshold, identify the type of the interaction in addition to identifying the interaction as the performance bottleneck.

10. The apparatus according to claim 8, wherein the instructions to obtain the sequence of interactions between the transaction and the one or more processing components in the transaction processing component when processing the transaction in the transaction processing component further cause the processor to:
  extract the transaction's calling of the one or more processing components from an implementation of the transaction; and
  generate the sequence of interactions on the basis of the calling.

11. The apparatus according to claim 10, wherein the implementation of the transaction is code of the transaction, and wherein the instructions to extract the transaction's calling of the one or more processing components from the implementation of the transaction further cause the processor to:
  look up a keyword in code of the transaction so as to obtain the calling.

12. The apparatus according to claim 10, wherein the implementation of the transaction is an executable program of the transaction, and wherein the instructions to extract the transaction's calling of the one or more processing components from the implementation of the transaction further cause the processor to:
  obtain the calling from an interface manager in the transaction processing system when running the executable program.

13. The apparatus according to claim 8, wherein the instructions to collect, at the predefined time point, the status information of the interaction between the transaction and the processing component among one or more processing components in the transaction processing system further causes-cause the processor to:
  collect the status information at the predefined time point in response to any one of:
   a timeout of processing the transaction in the transaction processing system; or
   at predefined time intervals.

14. A computer program product comprising a computer readable storage medium having a computer readable program stored therein, wherein the computer readable program, when executed on a computing device, causes the computing device to:
  collect, at a predefined time point, status information of an interaction between the transaction and a processing component among one or more processing components in the transaction processing system, wherein the computer readable program to collect, at the predefined time point, the status information of the interaction between the transaction and the processing component among one or more processing components in the transaction processing system further causes the computing device to:
   build a dummy transaction corresponding to the transaction, wherein the computer readable program to build the dummy transaction corresponding to the transaction further causes the computing device to:
    obtain a sequence of interactions between the transaction and one or more processing components in the transaction processing component when processing the transaction in the transaction processing component; and
    build the dummy transaction on the basis of the sequence of interactions so that the dummy transaction executes interactions in a corresponding sequence in order when processing the dummy transaction in the transaction processing component, wherein the computer readable program to build the dummy transaction on the basis of the sequence further causes the computing device to:
  copy a portion in an implementation of the transaction which corresponds to the interaction in the sequence of interactions, as an implementation of the dummy transaction; and
  use dummy data to replace sensitive data in the implementation of the dummy transaction; and
collect, at the predefined time point, status information of an interaction between the dummy transaction and the processing component as the status information of the interaction between the transaction and the processing component;
determine a duration of the interaction on the basis of the status information; and
in response to the duration of the interaction exceeding a predefined threshold, identify the interaction as the performance bottleneck of the transaction in order to make changes to the transaction processing system thereby improving performance.

15. The computer program product according to claim 14, wherein the computer readable program further causes the computing device to:
  collect a type of the interaction; and
  in response to the duration of the interaction exceeding a predefined threshold, identify the type of the interaction in addition to identifying the interaction as the performance bottleneck.

16. The computer program product according to claim 14, wherein the computer readable program to obtain the sequence of interactions between the transaction and the one or more processing components in the transaction processing component when processing the transaction in the transaction processing component further causes the computing device to:
  extract the transaction's calling of the one or more processing components from an implementation of the transaction; and
  generate the sequence of interactions on the basis of the calling.

17. The computer program product according to claim 16, wherein the implementation of the transaction is code of the transaction, and wherein the computer readable program to extract the transaction's calling of the one or more processing components from the implementation of the transaction further causes the computing device to:
  look up a keyword in code of the transaction so as to obtain the calling.

18. The computer program product according to claim 16, wherein the implementation of the transaction is an executable program of the transaction, and wherein the computer readable program to extract the transaction's calling of the one or more processing components from the implementation of the transaction further causes the computing device to:
  obtain the calling from an interface manager in the transaction processing system when running the executable program.

19. The computer program product according to claim 14, wherein the computer readable program to collect, at the predefined time point, the status information of the interaction between the transaction and the processing component among one or more processing components in the transaction processing system further causes the computing device to:
  collect the status information at the predefined time point in response to any one of:
  a timeout of processing the transaction in the transaction processing system; or
  at predefined time intervals.

\* \* \* \* \*